(12) United States Patent
van den Heuvel et al.

(10) Patent No.: US 12,703,587 B2
(45) Date of Patent: Aug. 11, 2026

(54) METHOD OF RELOADING CONSIGNMENTS

(71) Applicant: Ford Global Technologies, LLC, Dearborn, MI (US)

(72) Inventors: Bas van den Heuvel, Wijnandsrade (NL); Rob Stalman, Selfkant (DE); Mark Gijbels, Vlaams-brabant (BE); Rainer Souschek, Aachen (DE); Martin Kapp, Dormagen (DE); Pieter Diepenmaat, Rotterdam (NE); Wouter van der Hoog, Dearborn, MI (US)

( * ) Notice: Subject to any disclaimer, the term of this patent is extended or adjusted under 35 U.S.C. 154(b) by 360 days.

(21) Appl. No.: 18/536,221

(22) Filed: Dec. 11, 2023

(65) Prior Publication Data

US 2024/0190671 A1 Jun. 13, 2024

(30) Foreign Application Priority Data

Dec. 12, 2022 (DE) ......................... 102022132927.5

(51) Int. Cl.
*B65G 67/20* (2006.01)
*B65G 67/24* (2006.01)

(52) U.S. Cl.
CPC ............. *B65G 67/20* (2013.01); *B65G 67/24* (2013.01)

(58) Field of Classification Search
CPC ....... G06Q 10/083; B60P 1/64; B65G 63/002; B65G 63/004; B65G 67/24; B65G 67/20
See application file for complete search history.

(56) References Cited

U.S. PATENT DOCUMENTS 6,406,249 B1 * 6/2002 McAdams ........... B65D 88/121 414/800
2010/0040440 A1 * 2/2010 Lessmann ............... B64F 1/368 414/222.01
2011/0058923 A1 * 3/2011 Campbell ............ B65G 63/002 414/400
2020/0125109 A1 * 4/2020 Velten .................... B65G 65/00
2021/0122590 A1 * 4/2021 Garner ................... B65G 67/20
(Continued)

FOREIGN PATENT DOCUMENTS

CN 118183112 A * 6/2024 ............. B65G 47/74

*Primary Examiner* — Kaitlin S Joerger
(74) *Attorney, Agent, or Firm* — Emily Campbell; Eversheds Sutherland (US) LLP

(57) ABSTRACT

The invention relates to a method of reloading consignments, in the case of which consignments are transported between at least one logistics center and at least one end customer by means of at least one large vehicle and at least one small vehicle, which may be at least two-axle road vehicles, wherein the small vehicle is electrically operated and has a smaller track width and a lower load capacity than the large vehicle. In order to enable efficient logistical linking of end customers in urban areas, it is provided that at least the following steps may be carried out: reloading consignments between a large vehicle and the logistics center, performing a journey of the large vehicle between the logistics center and a reloading location, reloading consignments between the large vehicle and a small vehicle at the reloading location, performing a journey of the small vehicle between the reloading location and at least one end customer, and reloading consignments between the small vehicle and the at least one end customer.

12 Claims, 9 Drawing Sheets

(56) References Cited

U.S. PATENT DOCUMENTS

| | | | | |
|---|---|---|---|---|
| 2022/0204269 | A1* | 6/2022 | Zheng | B65G 1/1371 |
| 2023/0312248 | A1* | 10/2023 | Oda | B65G 1/0492<br>700/214 |

* cited by examiner 10
20
30
40
41
42
45
48

60
19
30
30
30
23
22
5,8
5,8
27
19,34
20
26
40

30
30
32
32
34
34
60,65
61,65
5
5,8
25
5
5
22
62,65
20
40

20
21
30
30
40
53
55
55
55
55
55
55
55
60

METHOD OF RELOADING CONSIGNMENTS

CROSS-REFERENCE TO RELATED APPLICATIONS

The applications claims priority to and the benefit of German Application No. 102022132927.5, filed Dec. 12, 2022, which is hereby incorporated by reference herein in its entirety.

FIELD OF THE INVENTION

The invention relates to a method of reloading consignments.

BACKGROUND

Conventional, comparatively large delivery vehicles are still primarily being used in the logistics sector to deliver goods from distribution centers to end consumers. In future, many cities will introduce zero-emission zones in which vehicles with internal combustion engines are not permitted, and moreover ban large and/or heavy vehicles from the inner cities. Irrespective of explicit bans, vehicles with internal combustion engines are generally increasingly viewed negatively. In future, there will also be more purely pedestrianized zones into which conventional delivery vehicle may not drive. This is on top of further challenges. The increasing demand for delivery services may also lead to greater obstruction of traffic, e.g. in the case of delivery, which negatively influences public opinion. Customers nevertheless increasingly demand timely delivery, in particular in the case of perishable goods.

Many of the above-mentioned problems can indeed be solved by the use of small, electrically operated delivery vehicles (LEFV, Light Electric Freight Vehicle), but these do not have the necessary range to shuttle between distribution center and end customer. They are furthermore not efficient if they are used in this manner since they only have a small load capacity, which could require an increased number of journeys for the same load. The range problem can also not generally be solved by setting up distribution centers close to customers since the high real estate costs in urban areas are an obstacle to this.

U.S. Pat. No. 10,137,816 B2 discloses a vehicle system, comprising a housing, a wheel system, as well as a mobile product distribution system. This comprises a product movement system as well as several doors formed on the housing, with respect to which doors incoming vehicles and outgoing vehicles align themselves, while products are distributed from each of the incoming vehicle to at least one of the outgoing vehicles, wherein the product movement system extends between the doors and the control circuit instructs the control of the product movement system in order to bring about the transport of the products through the product movement system from each of the incoming vehicles through the housing and to at least one of the outgoing vehicles.

A method for dispatching freight directly from the premises of a customer to the premises of a recipient is known from U.S. Pat. No. 6,406,249 B1. This involves transportation of at least one freight container to the premises of a customer, wherein one end wall of the freight container has an opening for loading and removing freight and wherein the container and the opening are sufficiently large to enable loading and unloading of freight into and out of the container by a conventional forklift. Moreover, a loading of the at least one freight container on the premises of the customer with freight and securing the freight in the freight container, as well as transport of the at least one freight container from the premises of the customer to the premises of the recipient of the freight are carried out.

U.S. Pat. No. 11,161,703 B2 shows a movable cross-dock for the redistribution of freight between freight containers, wherein the movable cross-dock has a first movable cross-dock portion with at least two edges and a first body supported by it, as well as a second movable cross-dock portion with at least two edges and a second body supported by it. A coupling mechanism is provided for detachable fastening of the first movable cross-dock portion to the second movable cross-dock portion so that the first body and the second body enclose an inner storage area. The freight can be moved into and out of the inner storage area through one of two openings.

CN 112 498 214 A discloses a mobile cabin which comprises a trolley body and a shelf arranged in the trolley body for mobile goods, wherein the trolley body comprises side opening devices which are arranged on two sides of the trolley body. The side opening device has an upper door which can open upwards and a lower door which can open downwards. Both doors can be opened by in each case a push-pull rod into a horizontal position. The lower side of the trolley body is provided with a rail and one of the inner side of the lower door is likewise provided with a rail which is aligned with the rail on the lower side of the trolley body and continues this so that the movable shelf can be moved along a rail.

U.S. Pat. No. 10,185,328 B2 discloses a method for transferring at least one consignment from a transfer vehicle to a handover vehicle, in the case of which a rough convergence is performed on the basis of positional data of the transfer vehicle and/or the handover vehicle, followed by a precise convergence of transfer vehicle and handover vehicle with alignment of speeds and directions of travel. In this case, the at least one consignment is transferred from the transfer vehicle to the handover vehicle during the travel of the transfer vehicle and the handover vehicle with matched speed and direction of travel, before, after the end of transfer, the transfer vehicle and the handover vehicle move away from one another.

In view of the highlighted prior art, there is still room for improvement in the efficient logistical linking of end customers in urban areas.

SUMMARY

The object on which the invention is based is to enable an efficient logistical linking of end customers in urban areas.

According to the invention, the object is achieved by a method of reloading consignments with the features of claim 1, wherein the subordinate claims relate to advantageous configurations of the invention.

It should be pointed out that the features and measures listed individually in the following description can be combined with one another in any desired, technically expedient manner and highlight further configurations of the invention. The description characterizes and specifies the invention in particular additionally in conjunction with the figures.

A method of reloading consignments is made available by the invention, in the case of which method consignments are transported between at least one logistics center and at least one end customer. The consignments can involve shipments, in particular packages of different sizes and shapes. The consignments generally involve any goods which are supposed to be transported between the logistics center and the end customer. Here and below the formulation "transport between A and B" relates at all times to a transport from A to B and/or a transport from B to A. Therefore, consignments can be transported from the logistics center to the end customer and/or vice versa from the end customer to the logistics center. It will be obvious that the consignments transported to the logistics center can be transported further from there, e.g. to another end customer. The consignments transported to the end customer can likewise have been previously transported to the logistics center, e.g. from another end customer. The term "end customer" encompasses here all commercial or non-commercial, private or public shippers and/or recipients of consignments. For the sake of simplicity, no differentiation is made linguistically between the end customer and the location of the end customer.

The method is performed with correspondingly adapted vehicles and elements adapted thereto which also represent aspects of the invention.

Transport is performed by means of at least one large vehicle and at least one small vehicle. This should be understood such that transport is performed using these vehicles. This does not rule out the possibility of performing transport additionally also partially manually or by other vehicles or devices. Both the at least one large vehicle and the at least one small vehicle are at least two-axle road vehicles. Each of these vehicles is accordingly provided with wheels and is designed for road travel. Each of the vehicles has at least two axles, in particular the large vehicle can nevertheless also have three or more axles. In general, at least one axle has two wheels, in particular this can apply to each axle. The term "road vehicle" also includes in this context that it involves motor vehicles with their own propulsion. The large vehicle can nevertheless have a semi-trailer or a trailer. Since they are used to transport consignments, both vehicles can also be referred to as transport vehicles or heavy goods vehicles.

In this case, the small vehicle is operated electrically and has a smaller track width as well as a lower load capacity than the large vehicle. As a result of its electric drive and its other characteristics, the small vehicle can typically be referred to as an LEFV (Light Electric Freight Vehicle). Such LEFVs are characterized by a small size and low empty weight (typically at most 1 t) and in general by a small track width (e.g. at most 1.4 m), which is still less than the track width of normal passenger cars. In contrast, the large vehicle has a significantly larger track width which is typically at least 1.8 m, at least 2 m, or at least 2.2 m. The large vehicle can involve in particular a light, medium-weight or heavy HGV. The loading capacity, i.e. the admissible load is in the case of the large vehicle normally at least 2 t, in some cases also at least 5 t or at least 10 t. In contrast, the loading capacity of the small vehicle is generally around at most 1.5 t, at most 1 t or at most 0.7 t. The cargo compartment volume of the small vehicle is also generally smaller than that of the large vehicle. The former is normally at most 5 $m^3$, or at most 3 $m^3$, while the latter is generally at least 7 $m^3$, at least 10 $m^3$ or at least 20 $m^3$. The maximum range of the small vehicle is typically also significantly smaller than that of the large vehicle. The range of the small vehicle is normally less than 200 km, while the range of the large vehicle is normally more than 400 km. While the small vehicle is electrically driven, the large vehicle can at least additionally be driven by an internal combustion engine.

In the case of the method according to the invention of reloading, at least the steps mentioned above are carried out, wherein these can be performed in a different and (where expedient) any desired sequence.

According to one step, a reloading of consignments between a large vehicle and the logistics center is performed. Here and below, the formulation "reloading between A and B" always relates to a reloading from A to B and/or a reloading from B to A. I.e. in this step consignments are reloaded from the large vehicle to the logistics center and/or vice versa. In particular, it is possible that the large vehicle unloads consignments at the logistics center and takes on other consignments from the logistics center. The consignments are regarded as being reloaded to the logistics center if it was reloaded in a storage space to a conveying device, a forklift, a base, a platform or the like which are assigned to the logistics center. The reloading can be performed manually and/or with machine assistance.

A further method step includes performing a journey of the large vehicle between the logistics center and a reloading location. I.e. the large vehicle drives from the logistics center to the reloading location or vice versa. As will be explained below, the reloading location is a location at which reloading of consignments is performed. In some configurations of the method, the reloading location can be configured in a particular manner for this purpose, in other configurations it can involve an otherwise arbitrary location which has a sufficiently large area for the reloading process. In some configurations, an area which is specially reserved for reloading can be used, in other configurations it would be possible that any desired, currently free area is used. It could be e.g. an area at the side of a road, possibly a sufficiently large lay-by, or a part of a large car park, only to cite a few examples. In any event, the reloading location is arranged outside the logistics center. It is typically at least several kilometers or several tens of kilometers from the logistics center.

According to a further method step, reloading of consignments between the large vehicle and a small vehicle is performed at the reloading location. Consignments are therefore reloaded from the large vehicle to the small vehicle and/or vice versa. Insofar as the large vehicle takes over consignments from the small vehicle, these can be transported, for example, to a logistics center. If the small vehicles takes over consignments from the large vehicle, these originate at least partially from the logistics center which nevertheless includes the possibility that consignments are also taken over which the large vehicle has not taken over (at least not directly) in the logistics center.

A further method step includes performing a journey of the small vehicle between the reloading location and at least one end customer. A multiplicity of end customers are typically driven to in the course of this journey. During this journey, the small vehicle generally transports consignments, either from the end customer to the reloading location or from the reloading location to the end customer. It is nevertheless also possible that the small vehicle performs a journey without transporting consignments. This can be, for example, the case when the small vehicle has delivered all the consignments to the end customers without taking on new consignments. The total distance of the journey is of course adjusted to the range of the small vehicle so that ideally no charging of the small vehicle is necessary during the journey. The end customers are normally located in a small radius of, for example, at most 20 km or at most 10 km around the reloading location. For example, this can involve end customers within a city or even within an area of a city. At least one end customer may be located in an area which is not accessible for the large vehicle, for example, as a result of local regulations or as a result of space restrictions. For example, conventional motor vehicles, in particular motor vehicles with an internal combustion engine, might not be permitted in the area. It could also be the case that the area is only accessible via a passageway for which the large vehicle is too high, too wide and/or too heavy. This could also involve an area which is indeed in principle accessible for conventional motor vehicles, but these are viewed as a disturbance. It could also be the case that a space for even only short-term parking of the large vehicle is not available at the end customer, while such a space is available for the significantly smaller small vehicle.

A reloading of consignments is furthermore performed between the small vehicle and the at least one end customer. I.e. the small vehicle can unload consignments at the end customer and/or take on consignments. As already mentioned, several end customers are normally visited consecutively. The reloading at the end customer is normally performed manually, possibly with the aid of mechanical aids such as a handcart or a trolley. Machine aids could nevertheless also be used here.

The above-mentioned method steps can be carried out in particular in the stated sequence so that the large vehicle takes on consignments at the logistics center, drives with these to the reloading location, where consignments are reloaded onto (at least) one small vehicle. The small vehicle then drives with the consignments to one or more end customers, wherein the consignments are unloaded. Another possibility lies in the fact that the steps are performed precisely in the reverse sequence, wherein the small vehicle takes on consignments at one or more end customers and drives with them to the reloading location, where at least a part of the consignment is reloaded onto the large vehicle. The large vehicle subsequently travels with the consignment to the logistics center and unloads it there. In terms of chronology, several methods steps can nevertheless also be performed parallel to one another. For example, the small vehicle can travel with consignments from the end customer to the reloading location, while the large vehicle travels with other consignments from the logistics center to the reloading location. At the reloading location, the large vehicle and the small vehicle can exchange consignments, after which the small vehicle travels in turn to one or more end customers, while the large vehicle can return to the logistics center. There can nevertheless also be a number of further options. For example, the large vehicle could hand over the consignments taken over from the small vehicle at this reloading location (or at a different reloading location) to a further small vehicle.

The logistics method according to the invention combines the advantages of the two vehicle types used in an efficient manner. As a result of its large range, the large vehicle can readily reach a suitable reloading location which lies in the area of action of the respective small vehicle. The small vehicle which has a small range can, however, serve end customers in areas which the large vehicle cannot reach on physical or legal grounds. As a result of its electric drive, its low load capacity and its normally small empty mass, the small vehicle is furthermore significantly better suited to numerous stopping and starting processes which are typical for the journey in the area of the end customers. The intended reloading location can, under certain circumstances, be selected flexibly depending on the current possibilities or requirements. In many cases, it only has to have a sufficiently large free area which can optionally be reserved for reloading. Even if it must have further features in some embodiments which are discussed below, it is in any case designed to be several times smaller and more simple than the logistics center. It can thus be located, for example, at the edge of a city or even after a city center.

Although a reloading between a large vehicle and precisely one small vehicle is possible at a reloading location, this tends to be unusual and in many cases is also inefficient. Consignments are preferably reloaded between a large vehicle and a multiplicity of small vehicles at a reloading location. I.e. the large vehicle remains at the reloading location, while consignments are reloaded between it and several small vehicles. The reloading can be performed consecutively with the various small vehicles. However, consignments can preferably also be reloaded simultaneously between a large vehicle and a multiplicity of small vehicles. Which option is selected depends on various factors, for example, on the suitability of the vehicles involved and the reloading location to perform simultaneous reloading with several small vehicles or on the time schedules of the vehicles involved. As already discussed, the large vehicle can unload consignments onto each of the small vehicles and/or take them on from it. In particular, it is also possible that the large vehicle to a certain extent serves as a mobile interim store and takes on consignments from a small vehicle and passes these on to another small vehicle at the same reloading location.

One configuration provides that both the large vehicle and the small vehicle have fixedly installed cargo compartments between which the consignments are exchanged. Such a cargo compartment normally has a cargo base. Cargo walls can be provided to the side thereof which delimit the cargo compartment and prevent the load from falling off at the side. Moreover, a fixed or removable cover can be provided. Here and below, the term “cargo compartment” should nevertheless not be interpreted too narrowly and the cargo compartment can be defined generally as the space above the cargo base, irrespective of whether and which further elements are present to secure the load.

According to another configuration, at least one large vehicle transports consignments in a storage container between the logistics center and the reloading location, wherein the storage container is unloaded from a large vehicle at the reloading location, before consignments are reloaded between at least one small vehicle and the storage container, after which the storage container is loaded back onto a large vehicle. The storage container is a container in which consignments can be transported. The large vehicle can take on the storage container, wherein it is possible that it can transport a multiplicity of storage containers. It can nevertheless typically take on precisely one storage container. The term “storage container” relates to the fact that it is provided to be parked for the reloading of consignments. The cargo compartment volume of the storage container is typically significantly larger than that of a small vehicle, and is, for example, at least twice as large. In this regard, one can also classify this container as a “large container”. The storage container is unloaded from a large vehicle at the reloading location, wherein it can be placed e.g. on the ground, on a frame or on a platform. It can be placed on adjustably, e.g. extendably, formed legs. The large vehicle could then, for example, leave the reloading location, while the storage container remains there. In any case, one of more small vehicles can take on consignments from the parked storage container and/or hand them over to it. Once reloading between the at least one small vehicle and the storage container is concluded, it is loaded up again on a large vehicle. This can involve a large vehicle which has transported it to the reloading location or, however, a different large vehicle. The advantage in the case of this embodiment lies in the fact that consignments can be reloaded at the reloading location over a longer period of time without the large vehicle having to remain at the reloading location during the entire period of time. The storage container furthermore requires less space than the entire large vehicle.

Under certain circumstances, it may be sufficient and/or necessary on the grounds of space that at most one storage container is situated at the reloading location. This can, however, make it difficult to swap consignments, e.g. if a small vehicle is supposed to hand over consignments to the storage container, while at the same time a different small vehicle should take over consignments from the storage container. A different configuration therefore provides that at the first reloading location a first storage container as a delivery container and a second storage container as a return container are dropped off simultaneously, wherein consignments are reloaded from at least one small vehicle into the return container and consignments are reloaded from the delivery container into at least one small vehicle. At least one small vehicle transports consignments from at least one end customer to the reloading location, where these consignments are reloaded into the return container. I.e. this container is the one to which consignments are returned. Moreover, at least one small vehicle takes over consignments from the delivery container and transports these thereafter to at least one end customer. The unloading of consignments from the delivery container and the loading of consignments into the return container can be performed chronologically parallel to one another without the two processes interfering with one another. If all of the small vehicles provided for this purpose have handed over their consignments to the return container, this return container can be loaded onto a large vehicle and transported to the logistics center. If all of the consignments have been unloaded from the delivery container, this delivery container can be transported directly to the logistics center. Alternatively, it would also be conceivable that this now empty container acts as a return container before it is picked up by a large vehicle.

While in the case of the above-mentioned embodiments, consignments are exchanged between a container and a small vehicle, it is also possible that a container is reloaded in its entirety between the large vehicle and a small vehicle. Such a configuration provides that at least one large vehicle transports a multiplicity of reloading containers between the logistics center and the reloading location, wherein in each case a reloading container is reloaded between the large vehicle and one of a multiplicity of small vehicles at the reloading location. The reloading containers serve to accommodate consignments. They are normally dimensioned so that a small vehicle can accommodate precisely one such reloading container, while a large vehicle can accommodate a multiplicity of such reloading containers. As a result of its dimensions, the reloading container can also be referred to as a “small container”. Insofar as the reloading containers have a long side and a narrow side, the reloading container can be transported on the small vehicle with the long side in the longitudinal direction of the vehicle, while the reloading containers are transported on the large vehicle with the long side in the transverse direction of the vehicle. It is advantageous in the case of this configuration that the reloading of a reloading container in its entirety can be performed more quickly than the reloading of consignments between the cargo compartment of a small vehicle and a cargo compartment of a large vehicle or a storage container. In order to support reloading of the reloading container, the large vehicle and/or the small vehicle could have an installed device. Alternatively, the reloading container itself could have a lifting device, for example, in the form of extendable legs, on which it can be raised or lowered. Finally, it would be possible that an industrial truck such as a forklift truck performs the reloading of the reloading container at the reloading location.

The reloading of consignments can be performed in various ways. In the simplest case, the consignments can be reloaded individually by hand. This is a typical procedure in particular for reloading at the end customer. However, this is unnecessarily laborious and time-consuming under certain circumstances for reloading at the reloading location. At least one transport trolley which accommodates a multiplicity of consignments is therefore preferably reloaded at the reloading location between the cargo compartment of a small vehicle and the cargo compartment of a large vehicle or a storage container. The reloading of the transport trolley is performed primarily, preferably exclusively, by movement thereof. The transport trolley normally has at least four wheels or rollers. It can have its own drive, but is generally moved manually. It will be obvious that such a transport trolley on one hand facilitates the movement of a heavy consignment and on the other hand involves a significant time saving when reloading a multiplicity of consignments. The transport trolley can be fixed or at least secured against larger displacements inside the respective cargo compartment or storage container.

Insofar as reloading is performed between cargo compartments, it is preferred that this is performed directly. In this regard, it can be advantageously provided that a connection between a cargo compartment of a large vehicle and a cargo compartment of a small vehicle is produced at the reloading location by a bridging device of at least one vehicle, after which consignments are reloaded between the cargo compartments via the bridging device without touching the ground. The direct exchange of load which is possible as a result of this can also be referred to a vehicle-to-vehicle load exchange or V2V exchange. The bridging device can be assigned to the large vehicle, the small vehicle or proportionally to both vehicles. It bridges the space between the cargo compartments and thus forms a platform, which can be walked on, between these cargo compartments. It can furthermore have means for securing a person or a transport trolley, for example, a safety rail which delimits the platform, a rail or the like. The bridging device (or a part thereof) can regularly be moved between a transport position in which it is arranged in a space-saving manner on or in the vehicle and a bridge position in which it projects from the vehicle and enables the transition to the cargo compartment of the respective other vehicle. The positioning of the large vehicle and the small vehicle in a suitable relative position and the establishment of the connection by the bridging device can be referred to overall as “docking”. The bridging device enables reloading of consignments, without them touching the ground, between the cargo compartments, i.e. the consignments do not have to be placed on the ground in the interim, and, for example, a person which is reloading the consignments does not have to walk on the ground to do this. In particular, an above-mentioned transport trolley can be moved via the bridging device directly from one cargo compartment to the other cargo compartment. The bridging device is or is normally arranged on a rear side of the small vehicle. In terms of the large vehicle, various arrangements may be advantageous. On one hand, the bridging device can be arranged on a rear side of the large vehicle, alternatively or additionally an arrangement to the side in the transverse direction may also be advantageous.

In particular if the large vehicle is significantly larger than a single small vehicle, it may be expedient that several small vehicles can dock simultaneously with the large vehicle. A corresponding configuration provides that connections between cargo compartments of a multiplicity of small vehicles and the cargo compartment of the large vehicle are produced by at least one bridging device, after which consignments can be reloaded at least partially simultaneously via the bridging devices between the cargo compartments of different small vehicles and the cargo compartment of the large vehicle. Connections can be produced on different sides of the large vehicle, for example, on the left-hand side, the right-hand side and/or the rear side. Alternatively or additionally, it is also possible that a multiplicity of connections are produced on one side of the large vehicle. For example, in the case of a very large, longitudinally extended large vehicle such as a heavy HGV, a multiplicity of small vehicles could be docked next to one another on a long side of its cargo compartment.

Additionally or alternatively to docking and direct reloading, indirect reloading is also possible. According to a corresponding embodiment, consignments are reloaded indirectly between a large vehicle and a small vehicle at the reloading location by virtue of the fact that the consignments are accommodated in the interim by an interim receiver. This may e.g. be expedient when a bridging device is not available or is occupied by another docking process. The interim receiver is neither part of the large vehicle nor the small vehicle and can in this regard be referred to as "external". It is designed to accommodate consignments per se, possibly also transport trolleys and/or reloading containers. These can be accommodated purely passively, but they can also be conveyed or transported actively by the interim receiver between the large vehicle and the small vehicle. An interim receiver can be formed in particular by a base, a platform installed at the reloading location and/or an industrial truck. A platform can advantageously have a height which corresponds to that of at least one cargo base or only deviates slightly from this. Consignments can thus be moved between the cargo base and the platform without a significant height difference having to be overcome. The industrial truck can be formed, for example, as a forklift truck. It can take on consignments directly from a cargo compartment and transport them to a different cargo compartment. It can be stationed at the reloading location and thus remain at the reloading location independently of the large vehicle and the small vehicle. Alternatively, it would nevertheless also be conceivable that the industrial truck is transported by a large vehicle, deposited at the reloading location for reloading and is subsequently picked up again by the large vehicle.

BRIEF DESCRIPTION OF THE DRAWINGS

Further advantageous details and effects of the invention are explained in greater detail below on the basis of various exemplary embodiments represented in the figures. In the figures

DETAILED DESCRIPTION

In the various figures, identical parts are always provided with the same reference numbers, which is why these are generally only described once.

Figure 1:
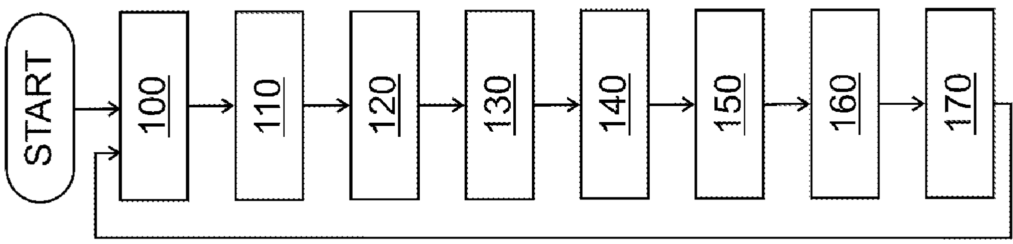
FIG. 1 shows a flow chart of a logistics method according to the invention.
Figure 2:
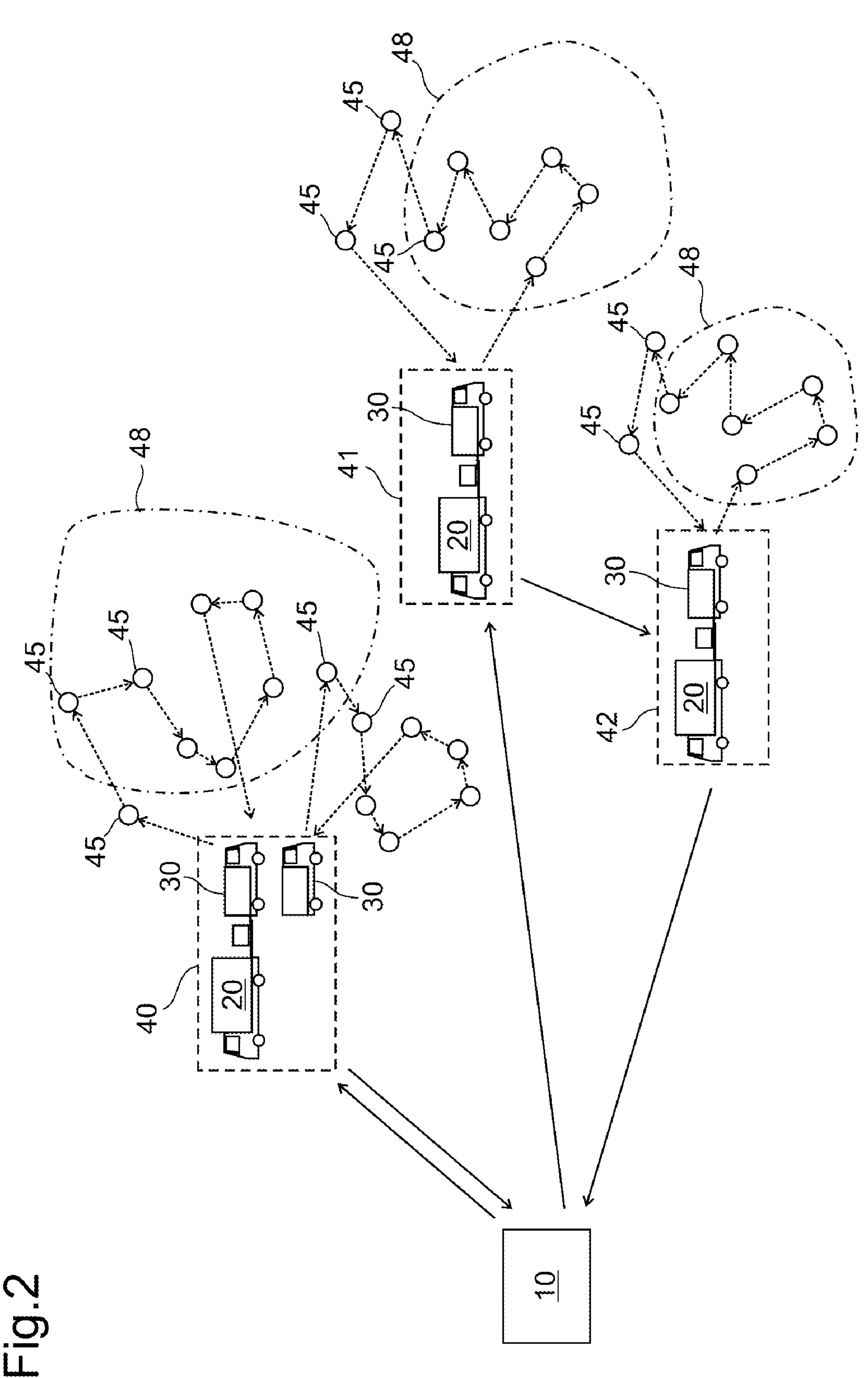
FIG. 2 shows a schematic representation of procedures in the case of the logistics method.

FIG. 1 shows a flow chart of a logistics method according to the invention, while FIG. 2 schematically illustrates various procedures of the logistics method. FIG. 2 represents a logistics center 10 from which consignments 5 should be delivered to various end customers 45 and/or to which consignments 5 should be delivered, which consignments are to be picked up by end customers 45. The transport of the consignment 5 is performed on one hand with large vehicles 20, which can be e.g. light, medium-weight or heavy HGVs with an internal combustion engine and/or electric motor, and with small vehicles 30, which are formed as LEFVs. These are electrically driven and have a significantly smaller track width than the large vehicles 20 as well as a significantly lower load capacity. As is indicated in FIG. 2, some end customers 45 are located in areas 48 which are not accessible for the large vehicle 20 either on physical grounds (e.g. small width or height of a passageway) or as a result of regulations (establishment of a zero-emissions zone or the like). At least some of the end customers 45 are typically located in urban areas.

In a first step 100, a reloading of consignments 5 is performed between the logistics center 10 and the respective large vehicle 20. In this case, in particular consignments 5 are reloaded from the logistics center 10 to the large vehicle 20. Thereafter, the large vehicle 20 travels to a reloading location 40, 41, 42 which can be set up e.g. on a car park or another free area at the edge of a city. It could however also be located at the side of a road. The area required for the reloading location can vary greatly. It is typically at least 12 m×2.5 m, but it can be significantly larger in some embodiments. In a further step 110, the large vehicle 20 performs a journey from the logistics center 10 to the reloading location 40, 41, 42, where in a further step 120 a reloading of consignments 5 to one or more small vehicles 30 is performed. The reloading can be performed in various ways, as will be explained below. In addition, the large vehicle 20 can also take on consignments 5 from one or more small vehicles 30. After reloading, the large vehicle 20 can return to the logistics center 10 in a further journey. Each of the journeys of the large vehicle 20 can correspond to a distance of several tens of kilometers. The range of the large vehicle 20 is several hundred kilometers, which is why a plurality of journeys can be carried out before the large vehicle 20 has to be filled up again or charged.

Once the respective small vehicle 30 has taken on consignments 5 from the large vehicle 20 (and possible has handed over consignments to the large vehicle), in a further step 130 it performs a journey which leads from the reloading location 40, 41, 42 to at least one end customer 45. A reloading of consignments 5 is performed at the end customer 45 in a next method step 140, i.e. a consignment 5 is unloaded at the end customer 45 and/or a consignment 5 is taken on from the end customer 45. The journey can further lead to a multiplicity of further end customers 45. Finally, the small vehicle 20 returns in step 150 to the reloading location 40, 41, 42, where it in step 160 can in turn hand over consignments 5 to a large vehicle 30 and/or take on consignments 5 from a large vehicle 30. The consignment 5 which is handed over from one or more small vehicles 20 at the reloading location 40, 41, 42 to the large vehicle 30 can, in step 170, be transported back to the logistics center 10. The method returns back to step 100.

The respective journey of the small vehicle 30 between the reloading location 40, 41, 42 and the end customers 45 typically comprises a few kilometers, possibly also a few tens of kilometers. The range of the small vehicle 30 can typically be a few hundred km, which is sufficient for several journeys. If the energy store of the small vehicle 30 is discharged to a certain degree, it can be charged, for which purpose, for example, a diversion could be made to a charging station (not represented) on a journey between reloading location 40, 41, 42 and end customer 45. Alternatively, a corresponding charging station could also be present at the reloading location 40, 41, 42.

FIG. 2 shows schematically a total of three reloading locations 40, 41, 42. A reloading between a large vehicle 20 and two small vehicles 30 is performed at a first reloading location 40. A reloading between a large vehicle 20 and a small vehicle 30 is performed at a second reloading location 41, wherein, prior to the return to the logistics center 10, the large vehicle 20 travels further to a third reloading location 42, where a reloading is performed with a further small vehicle 30. Each of the small vehicles performs, starting from the respective reloading location 41, 42, a journey to a multiplicity of end customers 45. The journey also goes through areas 48 which are not accessible for the large vehicle 20.

Figure 3:
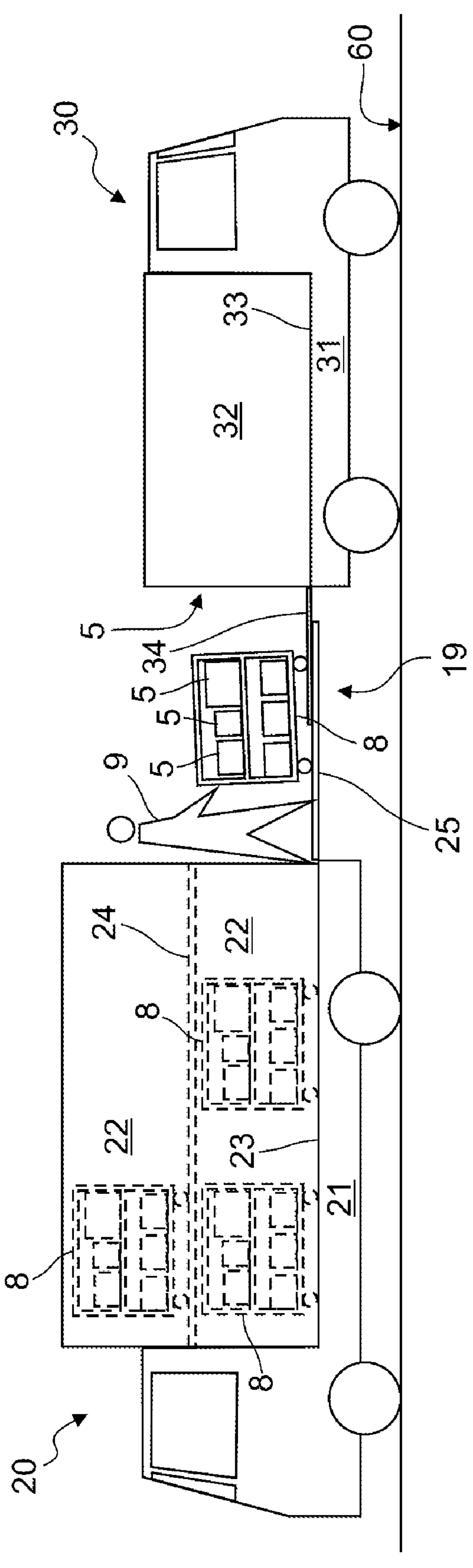
FIG. 3 shows a side view of a large vehicle and of a small vehicle at a reloading location in the case of the first reloading process.
Figure 4:
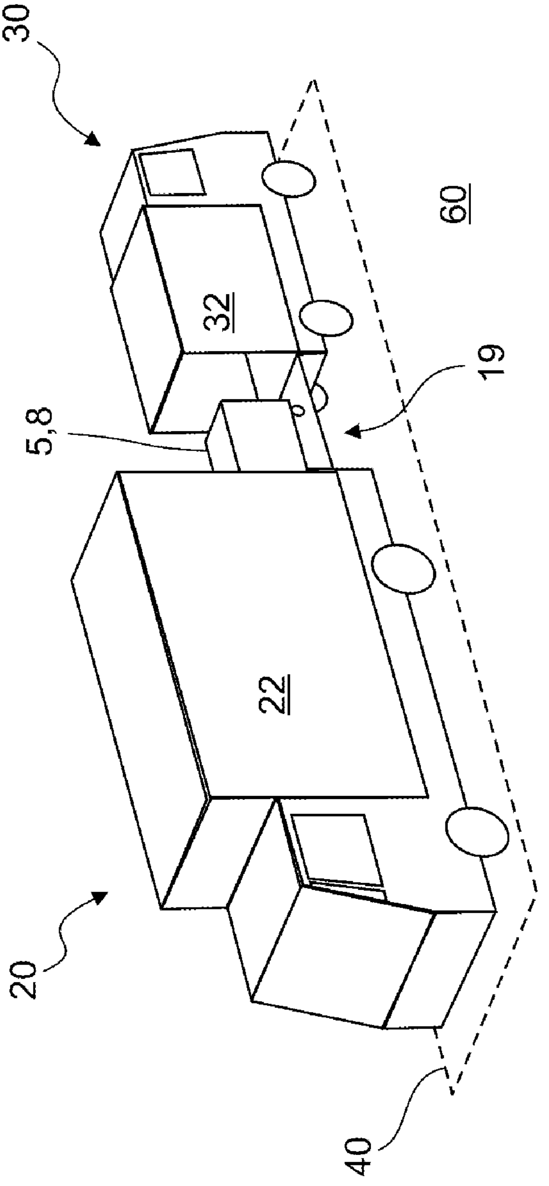
FIG. 4 shows a perspective representation of the vehicles in the case of the first reloading process corresponding to FIG. 3.

In terms of reloading between the large vehicle 20 and the at least one small vehicle 30, there are various options which are discussed below with reference to FIGS. 3 to 9. FIGS. 3 and 4 show a first option in the case of which a large vehicle 20 formed here as a small to medium-sized HGV and a small vehicle 30 are used which have in each case a cargo compartment 22, 32 which is arranged on a vehicle body 21, 31 and has a cargo compartment 23, 33. The vehicles 20, 30 are parked with their rear ends towards one another, according to which a bridging device 19 is configured between the cargo compartment 22 of the large vehicle 20 and the cargo compartment 32 of the small vehicle 20. For this purpose, a cargo platform 25 of the large vehicle 20 and a cargo platform 34 of the small vehicle 20 are positioned approximately horizontally and overlapping so that these jointly form the bridging device 19 via which consignments 5 can be reloaded without touching the ground. In the example shown, the consignment 5 is accommodated on transport trolleys 8 which are pushed manually between the cargo compartments 22, 32. Consignments 5 that are accommodated on the transport trolleys 8 can be easily transported without touching the ground from one cargo compartment 22, 32 to the other, therefore without a transport trolley 8 being placed on a ground 60 or a worker 9 having to walk on the ground. As shown here, the large vehicle 30 can have, in addition to a first cargo base 23, a second cargo base 24 which lies above the former which divides the cargo compartment 22 into two areas. For reloading between the second cargo base 24 and the cargo compartment 32 of the small vehicle, the cargo platform 25 can be moved upwards. The positioning of the two vehicles 20, 30 as well as the production of the transition between the cargo compartments 22, 32 can overall also be referred to as "docking". It can be assisted by sensors or at least in the end phase even be carried out fully automatically. The reloading process shown in FIG. 3 can be performed at a reloading location 40 with minimal space requirements, for example, at the side of the road on an area which corresponds to approximately three car parking spaces.

Figure 5:
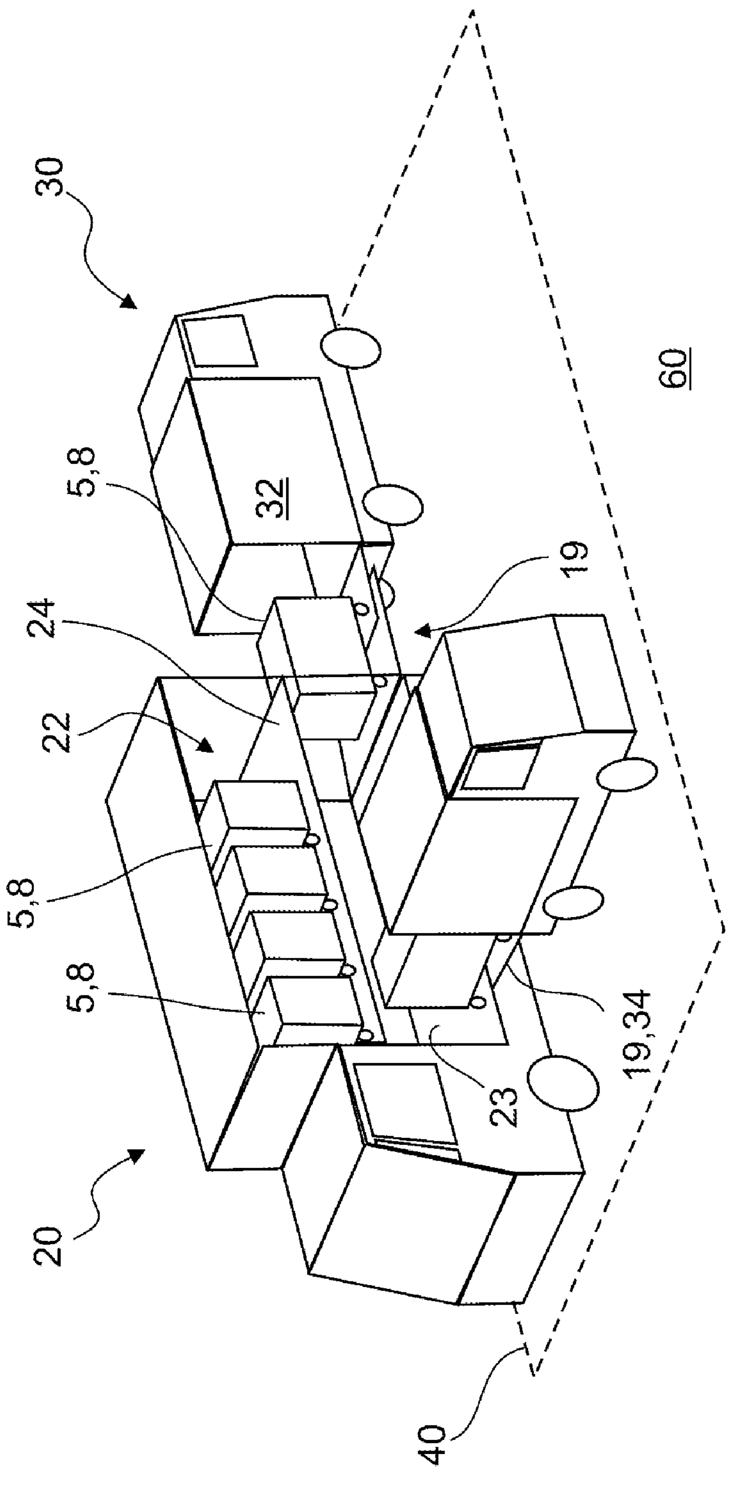
FIG. 5-9 shows a perspective representation of vehicles in the case of further reloading processes.

FIG. 5 shows a reloading process according to another embodiment, wherein a multiplicity of small vehicles 30 are simultaneously docked on different sides of a large vehicle 20. As a result of this, consignments 5 can simultaneously be reloaded into several small vehicles 30 or simultaneously from several small vehicles 30 into the large vehicle 20. It is also possible that consignments 5 are loaded from a small vehicle 30 into the large vehicle 20, while at the same time consignments 5 are reloaded from the large vehicle 20 into a different small vehicle 30. It would even be conceivable that consignments 5 are reloaded from a small vehicle 30 on a diversion via the large vehicle 20 into the other small vehicle 30. As a result of its larger load capacity and its cargo compartment which is larger in terms of volume, the large vehicle 20 is readily able to carry consignments 5 to load a multiplicity of small vehicles 30.

Figure 6:
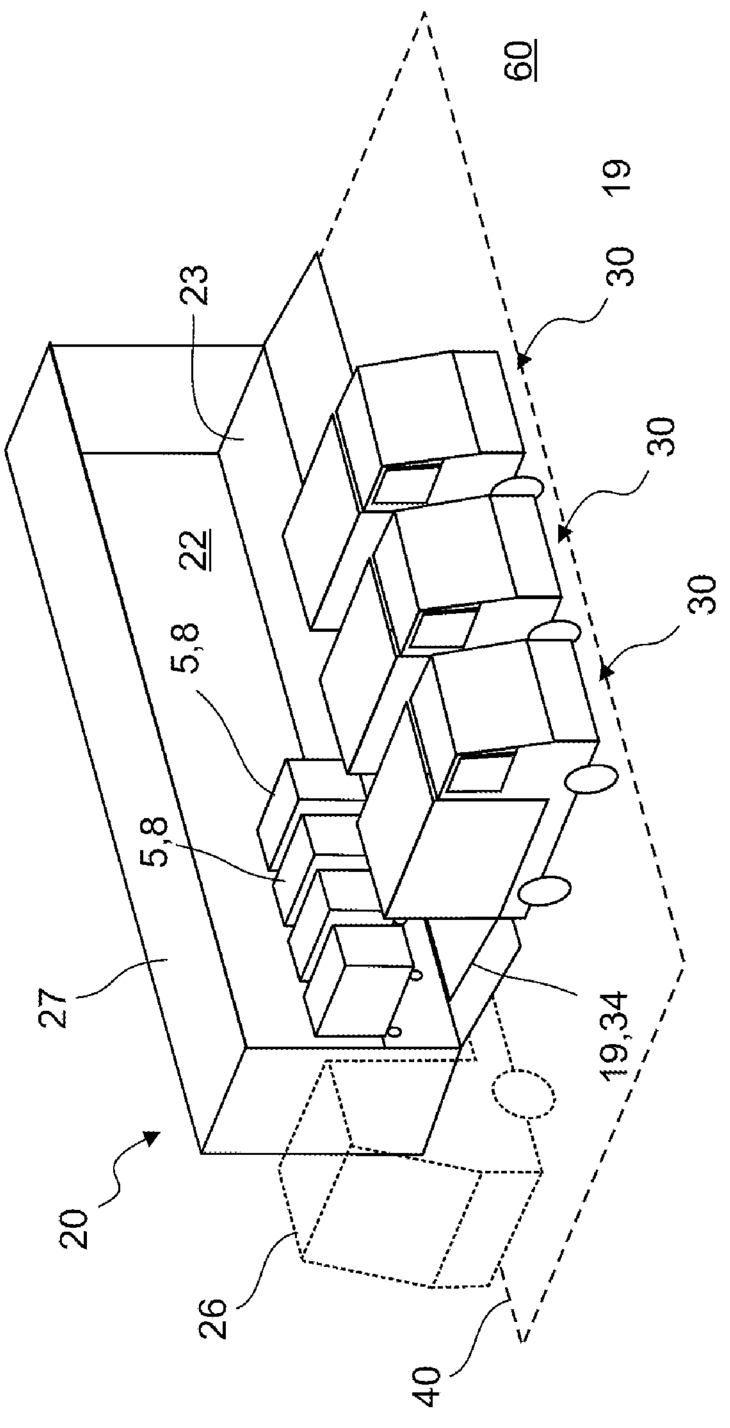

FIG. 6 shows a reloading process, in the case of which a large vehicle 20 formed as a heavy HGV is used. A lateral cladding of the cargo compartment 22 of the large vehicle 20 is folded down and thus enables simultaneous reloading between the large vehicle 20 and a multiplicity of small vehicles 30 which are all docked onto the large vehicle 20 on this side. The large vehicle 20 is formed as an articulated lorry with a tractor truck 26 and a trailer 27. As is indicated by the representation of the tractor truck 26 by dashed lines, it would also be conceivable that only the trailer 27 remains at the reloading location 40, while the tractor truck 26 leaves the reloading location and can be used for other purposes.

Figure 7:
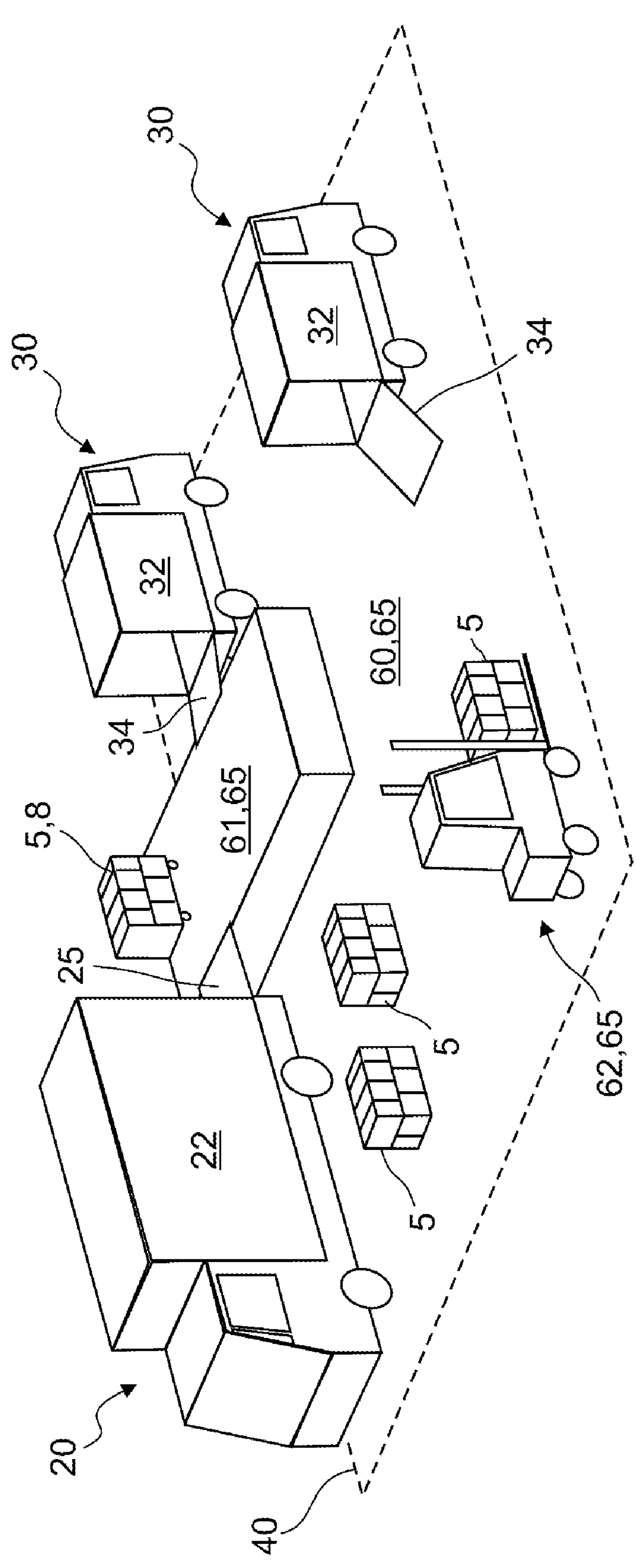

While FIGS. 4 to 6 show a direct reloading, without touching the ground, between the cargo compartments 22, 32 from large vehicle 20 and small vehicle 30, FIG. 7 shows various examples of indirect reloading, wherein the consignment 5 is taken up in each case by an interim receiver 65, before it is reloaded to the respective other vehicle 20, 30. For example, the ground 60 of the reloading location 40 can form an interim receiver 65. A platform 61 which is fixedly installed or can be installed where necessary could also be provided at the reloading location 40. This enables a reloading without the consignment 5 having to be significantly lowered and raised again. This can be advantageous in particular for the use of transport trolleys 8. In addition or as an alternative to these options, an intermediate receiver 65 can be formed by an industrial truck, in this case a forklift 62. The forklift 62 can remove the consignment 5 directly from a cargo compartment 22, 32 and load it directly into another cargo compartment 22, 32. Of course, it can also be used to unload consignments 5 from a cargo compartment 22, 32 onto the ground 60 or the platform 61 and/or transfer it from the ground 60 or platform 61 into a cargo compartment 22, 32.

Figure 8:
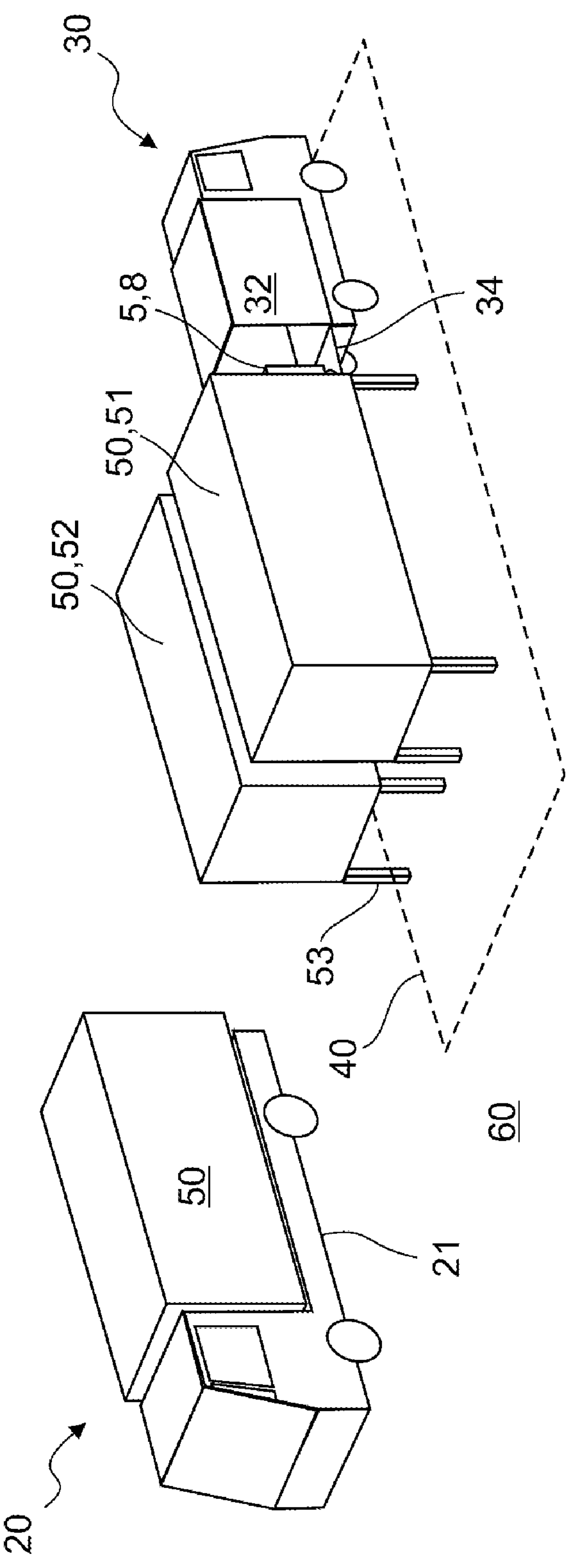

FIG. 8 shows the reloading process, according to a further embodiment of the logistics method, in the case of which the large vehicle 20 transports in each case a storage container 50 between the logistics center 10 and the reloading location 40. The storage container 50 is dropped off at the reloading location 40, after which the large vehicle 20 can leave the reloading location 40 again. The reloading of consignments 5 is furthermore performed between the dropped-off storage container 50 and at least one small vehicle 30. In the represented example, two storage container 50 (in each case on support legs 53) are dropped off, wherein one storage container 50 acts as a delivery container 51 and the other as a return container 52. It is provided in this case that a large vehicle 20 transports consignments 5 in a storage container 50 to the reloading location 40, which is deposited there as a delivery container 51. One or more small vehicles 30 then take on consignments 5 from the delivery container 51. Insofar as small vehicles 30 convey consignments 5 from an end customer 45 to the reloading location 40 which should be transported further to the logistics center 10, these consignments 5 are loaded into the return container 52 which were previously placed there by a large vehicle 20. Once the small vehicles 30 as provided have discharged all the consignments 5 in the return container 52, this is in turn loaded on a large vehicle 20 and transported to the logistics center 10. It can subsequently be replaced by a new return container 52. It would nevertheless also be conceivable that the storage container 50 which initially acts as a delivery container 51 is emptied and thereafter acts as a return container 52.

Figure 9:
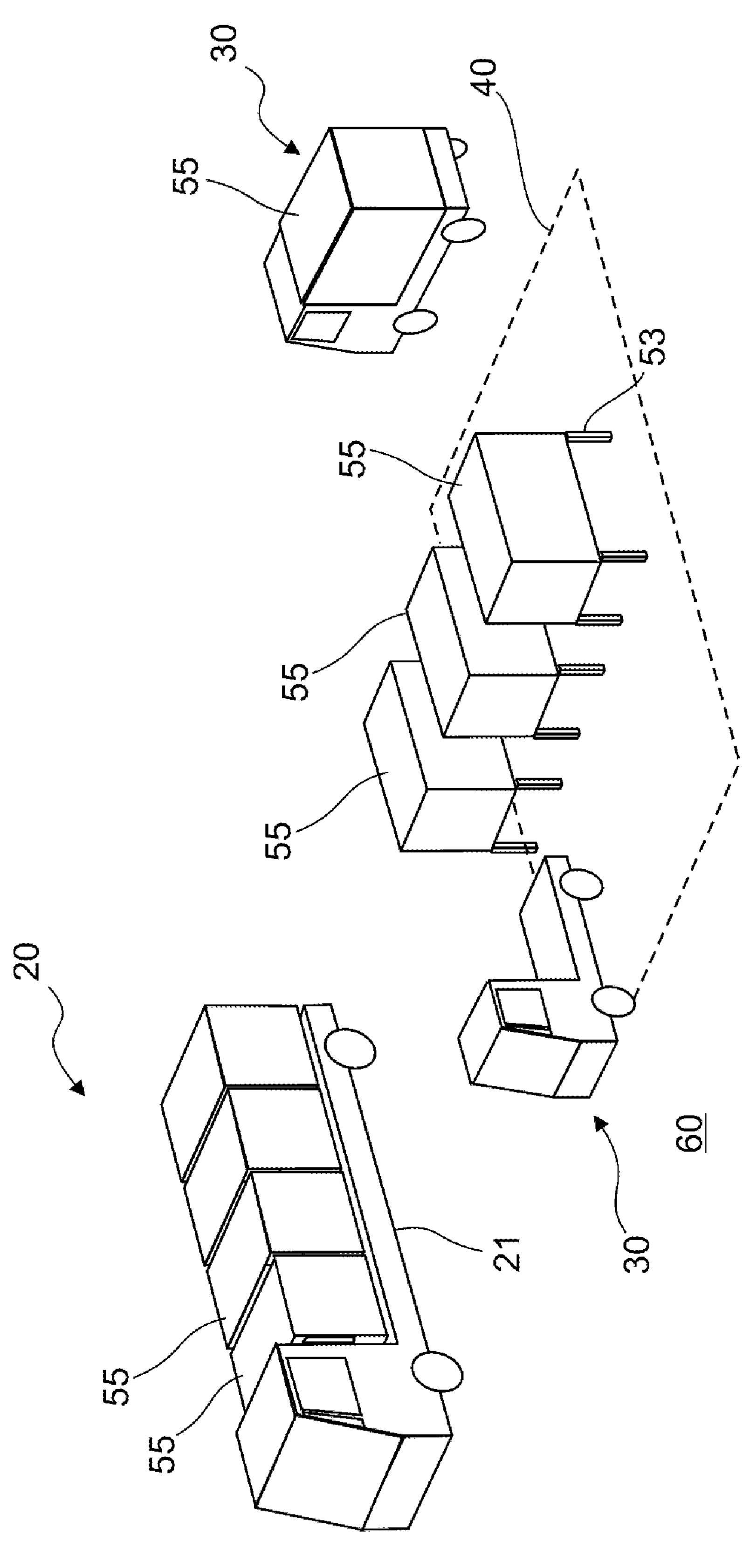

FIG. 9 shows a reloading process in the case of which the consignment 5 is not reloaded individually or pm individual transport trolleys 8 at the reloading location 40, but rather entire containers are reloaded. In this case, a large vehicle 20 transports a multiplicity of reloading containers 55, each of which contains consignments 5, from the logistics center 10 to the reloading location 40. In each case one reloading container 55 is reloaded onto a small vehicle 30 at the reloading location 40. Vice versa, a reloading container 55 can be reloaded from a small vehicle 30 onto the large vehicle 20. Reloading is not normally performed directly, but rather the respective reloading container 55 is placed in the interim via support legs 53 on the ground. The support legs 53 could optionally be arranged to be adjustable by means of actuators on the reloading container 55.

LIST OF REFERENCE SYMBOLS

- 5 Consignment
- 8 Transport trolley
- 9 Worker
- 10 Logistics center
- 19 Bridging device
- 20 Large vehicle
- 21, 31 Vehicle body
- 22, 32 Cargo compartment
- 23, 24, 33 Cargo base
- 25, 34 Cargo platform
- 30 Small vehicle
- 40, 41, 42 Reloading location
- 45 End customer
- 48 Region
- 50 Storage container
- 51 Delivery container
- 52 Return container
- 53 Support leg
- 55 Reloading container
- 60 Base
- 61 Platform
- 62 Forklift
- 65 Interim receiver

What is claimed is:

1. A method for reloading consignments, comprising the steps of:
   - reloading the consignments between a large vehicle and a logistics center;
   - performing a journey of the large vehicle between the logistics center and a reloading location;
   - reloading the consignments between the large vehicle and a small vehicle at the reloading location, wherein the small vehicle is electrically operated and has a smaller track width and a lower load capacity than the large vehicle;
   - performing a journey of the small vehicle between the reloading location and at least one end customer; and
   - reloading the consignments between the small vehicle and the at least one end customer,
   - wherein at the reloading location a first storage container as a delivery container and a second storage container as a return container are simultaneously dropped off, wherein the consignments are reloaded from at least one small vehicle into the return container and the consignments are reloaded from the delivery container into the at least one small vehicle.

2. The method of claim 1, wherein at the reloading location, the consignments are reloaded between the large vehicle and a multiplicity of small vehicles including the small vehicle.

3. The method of claim 2, wherein the consignments are substantially simultaneously reloaded between the large vehicle and the multiplicity of small vehicles.

4. The method of claim 1, wherein the large vehicle transports the consignments in a storage container between the logistics center and the reloading location, wherein the storage container is unloaded from the large vehicle at the reloading location, before the consignments are reloaded between at least one small vehicle and the storage container, after which the storage container is loaded back onto the large vehicle.

5. The method of claim 1, wherein the large vehicle transports a multiplicity of reloading containers between the logistics center and the reloading location, wherein at the reloading location in each case one reloading container is reloaded between the large vehicle and a multiplicity of small vehicles.

6. The method of claim 1, wherein at the reloading location at least one transport trolley, which accommodates the consignments, is reloaded between a cargo compartment of a small vehicle and a cargo compartment of the large vehicle or a storage container.

7. The method of claim 1, wherein at the reloading location a connection between the cargo compartment of the large vehicle and the cargo compartment of the small vehicle is produced by a bridging device of the large vehicle.

8. The method of claim 1, wherein connections between cargo compartments of the small vehicle and the cargo compartment of the large vehicle are produced by at least one bridging device, after which consignments are reloaded between cargo compartments of different small vehicles and the cargo compartment of the large vehicle at least partially simultaneously via the at least one bridging device.

9. The method of claim 1, wherein at the reloading location the consignments are reloaded indirectly between the large vehicle and the small vehicle in that the consignments are accommodated on an interim basis by an interim receiver, wherein an interim receiver can be formed in particular by a base, a platform installed at the reloading location and/or a forklift truck.

10. A system for reloading consignments, comprising:
   - a logistics center;
   - a large vehicle;
   - at least one small vehicle, wherein the at least one small vehicle is a two-axle road vehicle and has a smaller track width and a lower load capacity than the large vehicle;

a storage container that is configured to be unloaded from the large vehicle to the small vehicle at a reloading location; and a first storage container as a delivery container and a second storage container as a return container, wherein the consignments are reloaded from at least one small vehicle into the return container and consignments are reloaded from the delivery container into at least one small vehicle, and wherein the large vehicle include a bridging device configured to connect a cargo compartment of the large vehicle and a cargo compartment of the small vehicle for moving the container from the large vehicle to the small vehicle.

11. The system of claim 10, wherein the reloading location includes at least one transport trolley for moving the container.

12. The system of claim 10, wherein the small vehicle is electrically operated.

* * * * *